(12) United States Patent
Kempf (10) Patent No.: US 10,044,997 B2
(45) Date of Patent: Aug. 7, 2018

(54) METHODS AND APPARATUS FOR DIFFRACTION ARTIFACT REDUCTION IN IMAGE DISPLAY SYSTEMS

(71) Applicant: Texas Instruments Incorporated, Dallas, TX (US)

(72) Inventor: Jeffrey Matthew Kempf, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/672,035

(22) Filed: Aug. 8, 2017

(65) Prior Publication Data

US 2017/0339383 A1 Nov. 23, 2017

Related U.S. Application Data

(62) Division of application No. 15/134,054, filed on Apr. 20, 2016, now Pat. No. 9,743,055.

(51) Int. Cl.
*H04N 9/31* (2006.01)

(52) U.S. Cl.
CPC ......... *H04N 9/3185* (2013.01); *H04N 9/3105* (2013.01); *H04N 9/3182* (2013.01)

(58) Field of Classification Search
CPC ... H04N 9/3185; H04N 9/3105; H04N 9/3182
See application file for complete search history.

(56) References Cited

U.S. PATENT DOCUMENTS

| | | |
|---|---|---|
| 5,309,188 A | 5/1994 | Burstyn |
| 7,075,506 B2 | 7/2006 | Morgan et al. |
| 2007/0013717 A1 | 1/2007 | Kempf |
| 2014/0049766 A1 | 2/2014 | Hudman |

OTHER PUBLICATIONS

Texas Instruments, "DLPC300 DLP Digital Controller for the DLP3000 DMD," Online Data Sheet, Jan. 2012, revised Aug. 2015, pp. 1-51, http://www.ti.com/lit/ds/dlps023c/dlps023c.pdf.

*Primary Examiner* — Michael Teitelbaum
(74) *Attorney, Agent, or Firm* — Michael A. Davis, Jr.; Charles A. Brill; Frank D. Cimino (57) ABSTRACT

For an example method of reducing diffraction artifacts in a displayed image from a digital image projection system, a digital controller is coupled to a spatial light modulator. The spatial light modulator includes a two dimensional array of pixels. The method includes receiving signals containing pixel image data and processing the pixel image data to determine a desired gray scale for a pixel. The desired gray scale is compared to achievable gray scales of the digital image projection system. An upper bounding achievable gray scale is determined, and a lower bounding achievable gray scale is determined. Also, a dithering percentage for the desired gray scale is determined. The method chooses one of the upper bounding achievable gray scale and the lower bounding achievable gray scale. Also, a modified lower bounding gray scale is chosen to reduce the dithering percentage.

10 Claims, 7 Drawing Sheets

METHODS AND APPARATUS FOR DIFFRACTION ARTIFACT REDUCTION IN IMAGE DISPLAY SYSTEMS

CROSS-REFERENCE TO RELATED APPLICATIONS

This application is a divisional of U.S. patent application Ser. No. 15/134,054 filed Apr. 20, 2016, the entirety of which is incorporated herein by reference.

TECHNICAL FIELD

This relates generally to video display systems using spatial light modulators to modulate light with image pixel information to produce an image, and more particularly to digital image projection optical devices where reflective spatial light modulators are used to modulate the illumination light with image information, such as in image projection and display devices.

BACKGROUND

Spatial light modulators (SLMs) such as digital micromirror devices (DMDs), liquid crystal display (LCD) and liquid-crystal-on-silicon (LCoS) devices are often used to project images in projection systems. The optical projection systems can include televisions, video displays, and projectors. The optical projection systems are usually formed in two parts, which are: an illumination system for generating and collecting the light rays needed to illuminate an image, and a projection system for collecting the illuminated image light rays into a projection lens which projects the final image. At least one spatial light modulator receives the illumination light rays from the illumination system, modulates the light received with image data for visual display, and transmits image light rays for projection to the projection system. In many systems, the spatial light modulator is an array of reflective pixel elements. SLMs can be DMDs that receive digital image data and reflect (or do not reflect) the illumination light, forming an image corresponding to the digital image data.

Projection systems have been implemented with DMDs with relatively small pixel pitch, such as DMDs with a pixel pitch of less than 7 microns. For example, a DMD device currently available from Texas Instruments Incorporated has up to 2 million individually addressable pixel mirror elements in a two dimensional array. Systems incorporating these new, smaller devices can increase some visible artifacts due to potential interactions between the pixel elements and the illuminating light. A DMD with a small pixel pitch of less than about 7 microns operates as a diffraction grating for the wavelengths of illuminating light being used. This interaction can produce visible artifacts in the displayed image. Also, the dithering applied to produce precise gray scale outputs between the directly producible gray shade levels in these systems can create additional visible diffraction artifacts. Although the examples described herein are described with reference to DMDs used as SLMs, the same interaction can be found in other SLM devices, such as LCoS devices.

Diffraction artifacts are particularly visible across shallow gradients in a displayed image. Dithering techniques are used to create gray scale renditions for shades that fall between the limited numbers of gray shades that the system can directly produce with pulse width modulation. By alternating between the reproducible gray shades, the desired gray shade is created by "dithering" between these gray shades. When the pixel pitch is reduced to these new small sizes, the dithering techniques can also operate as interference patterns for the wavelength of visible light. The gray shade that is visible is then either brighter than expected (due to constructive interference) or darker than expected (due to destructive interference).

SUMMARY

For an example method of reducing diffraction artifacts in a displayed image from a digital image projection system, a digital controller is coupled to a spatial light modulator. The spatial light modulator includes a two dimensional array of pixels. The method includes receiving signals containing pixel image data and processing the pixel image data to determine a desired gray scale for a pixel. The desired gray scale is compared to achievable gray scales of the digital image projection system. An upper bounding achievable gray scale is determined, and a lower bounding achievable gray scale is determined. Also, a dithering percentage for the desired gray scale is determined. The method chooses one of the upper bounding achievable gray scale and the lower bounding achievable gray scale. Also, a modified lower bounding gray scale is chosen to reduce the dithering percentage.

DETAILED DESCRIPTION OF EXAMPLE EMBODIMENTS

Corresponding numerals and symbols in the different figures generally refer to corresponding parts unless otherwise indicated. The figures are not necessarily drawn to scale.

In described examples, an optical projection system has reduced or eliminated visible artifacts due to diffraction induced non-linearity in gray scale shade rendition. Example embodiments are especially advantageous when dithering techniques are used to produce gray scale shades between the gray scale shades that the system can directly achieve. In example embodiments, dithering is applied only to low intensity bit planes, reducing the artifacts to levels below the perceivable levels for the human visual system.

The term "coupled" may include connections made with intervening elements, and additional elements and various connections may be used between any elements that are "coupled." In some instances, a description of a data transmission may refer to a "line." The term "line" can also refer to a row or column, and these terms can be used interchangeably herein. Although some DMD controllers are used in arrangements to transmit lines of data, while other arrangements transmit columns, the terms "row" and "column" of pixels in a DMD are interchangeable, and the terms "line", "row" and "column" can all be used to describe data transmission to a DMD.

Figure 1:
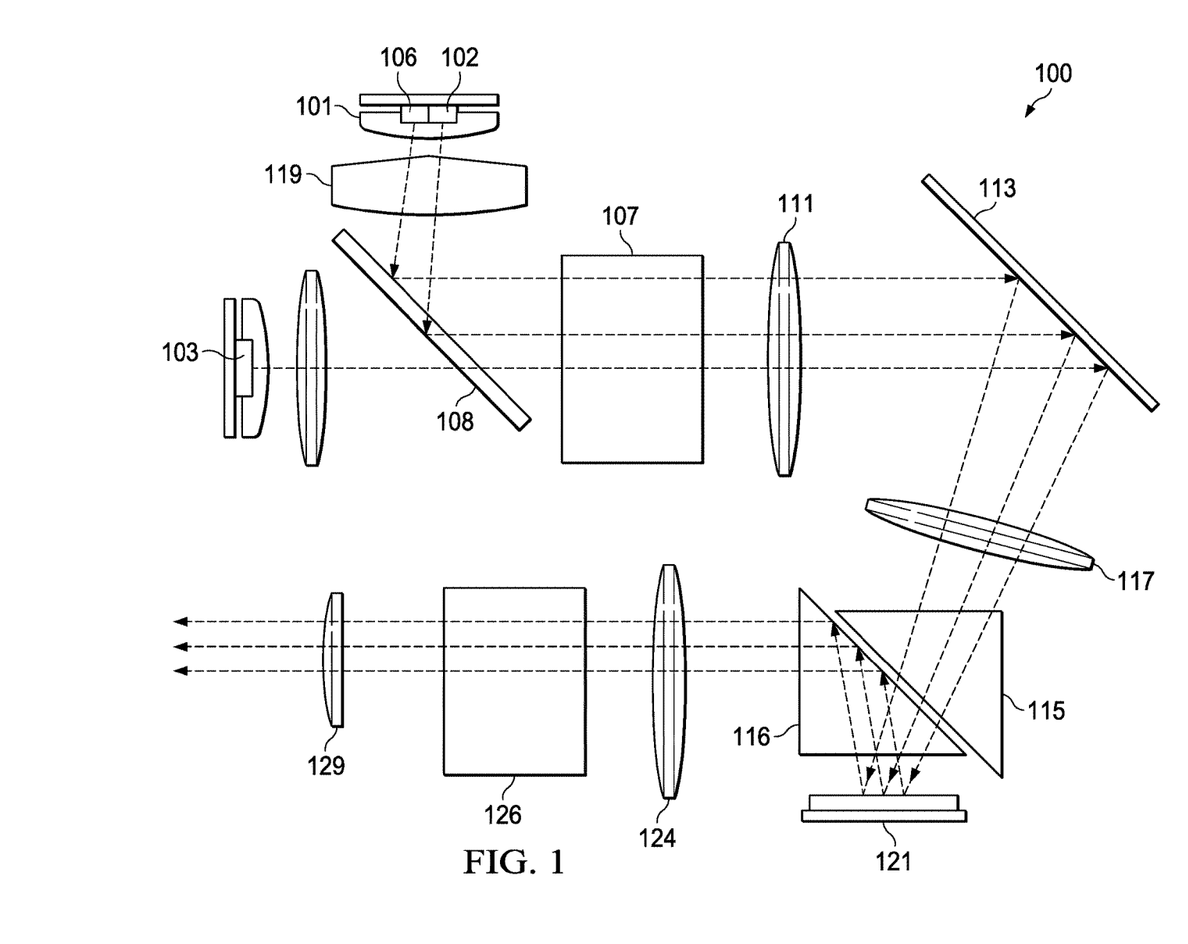
FIG. 1 depicts a simplified block diagram of a device incorporating an embedded optical projection system.

FIG. 1 shows a system block diagram of a top view or plan view of an example conventional projection system 100. System 100 is configured using conventional reverse total internal reflection (RTIR) projection architecture. In an RTIR architecture, a reverse total internal reflection prism is used in a projection path between a spatial light modulator and the projection optics, as is further described below. However, example embodiments are not limited to a particular illumination system or projection system.

In system 100, illumination is provided by the red, green and blue (RGB) LEDs 102, 103 and 106. However, alternative illumination sources can also be used, such as incandescent lamps with reflectors, single lamps with color wheels, laser and laser-phosphor illumination. The LEDs can include an optical coating or collimating optics 41 which operate to collect and collimate the light output by the LEDs. Other color schemes can be used, such as white, cyan, etc. As illustrated in FIG. 1, two LEDs 102 and 106 are shown on a single integrated device, and they be the red and green LED devices in this example, while the blue LED 103 is a separate discrete component. In alternative systems, three individual LEDs are used, and two dichroic plates in the form of an X box shape can be used to combine the three colors (RGB) into an illumination source. In the particular example shown in FIG. 1, dichroic plate 108 reflects the light from red LED 106 at one surface, reflects the light from green LED 102 at a second surface, and passes the light from blue LED 103 through and to the illumination path. In alternative arrangements, many LEDs can be used or multiple LEDs can be used, instead of one LED for each color. Color wheels can also be used with white illumination light, such as to create the colors.

In FIG. 1, an additional collimator 119 is placed between the LEDs 102, 106 and the dichroic plate 108. Collimators reduce the beam diverging angle. Integrator 107 is placed in the illumination path after the dichroic plate. The integrator 107 may be a "fly's-eye" integrator (also referred to as a lens array), or a rod integrator or tube integrator. Integrator 107 produces a more homogeneous light beam, which can then be transmitted through one or more relay lenses such as relay 111. The relay optics such as 111 can extend the length of the illumination path.

Mirror 113 folds the illumination light path. This reflective fold mirror also enables the illumination light rays to reach the spatial light modulator 121 at an angle. Because DMD 121 modulates the light by tilting reflective mirrors, the illumination rays must strike the mirrors at an angle. The folding mirror 113 makes control of the angle of the illumination rays to the surface of DMD 121 easier to achieve. Additional relay optics such as 117 can be placed between the mirror 113 and the DMD 121.

When a reflective spatial light modulator (such as DMD 121) is employed, the illumination light rays from mirror 113 that are entering the DMD package and the reflected image light rays leaving the DMD mirrors need to be physically separated to avoid interference, as shown in FIG. 1. An RTIR prism can separate the incoming rays of the illumination system from the image rays that are being transmitted into the projection optics. U.S. Pat. No. 5,309,188, entitled "Coupling Prism Assembly and Projection System Using Same," which is hereby incorporated by reference in its entirety herein, discloses a prism arrangement using total internal reflection to separate the illumination and projection light paths in a small space. As shown in FIG. 1, wedge prism 115 and TIR prism 116 together form a coupling prism that accomplishes the needed separation of the illumination light rays directed onto the spatial light modulator from the image light rays coming from the spatial light modulator. The image light rays exit prism 116 and are coupled into a projection system that includes optical elements 124, 126, and 129.

Figure 2:
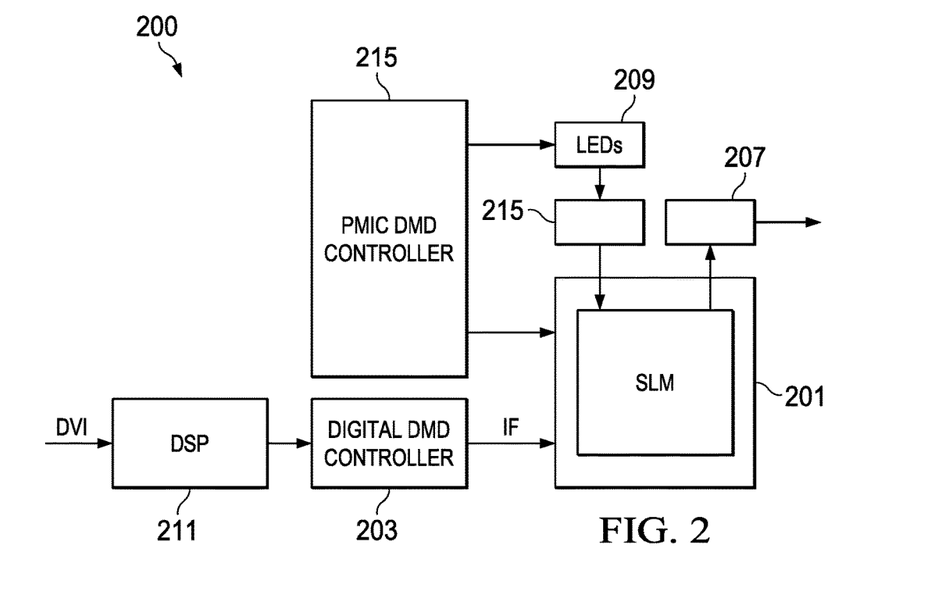
FIG. 2 depicts a simplified block diagram of a portion of a conventional projection system.

FIG. 2 shows a simple circuit block diagram of an example arrangement 200 for use with the compact optical projection system described above. A microprocessor, mixed signal processor, digital signal processor, microcontroller or other programmable device 211 executes instructions that cause it to output digital video signals for display. A variety of sources may provide the digital video signals labeled DVI in FIG. 2, including television transmitters, cable boxes, internet browsers, stored files in video cards, flash cards and USB drives, cameras, computers and camcorders. The microprocessor 211 is coupled to a digital DMD controller circuit 203. DMD controller 203 is another digital video processing integrated circuit. Sometimes this controller 203 can be implemented using a customized integrated circuit or an application specific integrated circuit (ASIC). An analog circuit configured to manage power and LED illumination referred to as a power management integrated circuit (PMIC) and numbered 215 is also provided. The PMIC 215 controls the intensity and power to the LEDs 209. DMD controller 203 provides digital data to the DMD 201 for modulating the illumination light that strikes the DMD surface, and the PMIC DMD controller 215 also provides power and analog signals to the DMD 201. Light rays from the illumination sources LEDs 209 are input to illumination components in block 215 such as the cover prism and wedge described above, and strike the reflective mirrors inside the package of DMD 201. The reflected light for projection leaves the surface of the DMD 201 and travels into the projection optics 207 which operate to project the image as described above. Together the integrated circuits 203, 215 cause the DMD 201 and the optical components 215, 207 to operate to project the digital video signals as an image.

In the circuit shown in FIG. 2, examples of useful integrated circuits include DMD controller ICs from Texas Instruments Incorporated. Examples of useful DMD controller ICs include the DLPC3430 DMD controller and the DLPC2601 ASIC device, which can provide both digital and analog controller functions. Analog DMD controller devices from Texas Instruments Incorporated are useful, such as the DLPA2000 device. For example, LED controller devices are useful to power on and off the RGB LEDs. The spatial light modulator can also be implemented using various ones of DMD devices available from Texas Instruments Incorporated.

To further explain operation of example embodiments, pulse width modulation (PWM) as applied to the display of images using a spatial light modulator is now described.

Employing digital data for image display is convenient for processing and storage, and projecting data from a frame buffer at discrete time periods is relatively practical when using a pixel array formed of addressable elements that "latch" the current value. However, the human visual system (HVS) is an analog system that integrates the images, and certain steps are necessary to divide the images into smaller portions that update frequently to avoid unwanted visible artifacts that appear to the viewer.

A "frame display time" can be determined using a typical metric of "60 frames per second" as the minimum display rate needed for the human visual system to see continuous motion in an image. However, faster frame rates reduce or avoid "rainbows" and other visible artifacts that can sometimes be observed, particularly when color is used and some portions of the image have multiple colors. For example, a 2× rate of 120 frames per second may be used.

Further "bit planes" can be defined to format the images for the spatial light modulator and also to further improve the images for display to the HVS. Because the pixel elements for a binary spatial light modulator are either "on" or "off", the intensity observed for a particular pixel is determined by the amount of time that pixel is on during the frame display time. The image data coming into the ASIC device may have several bits for each pixel, for each of the colors, to represent color intensity for a particular frame. A binary spatial light modulator can only process one bit per pixel for each image, so a mapping is performed to create the intensity levels needed for each pixel during the frame display time at the spatial light modulator. By subdividing the frame display time into bit planes, each having a bit for each of the pixels in the two dimensional array at the spatial light modulator, a variety of intensities, corresponding to a "gray scale" for one color, can be achieved. If the pixel is "on" for the entire display time, it will have a maximum brightness or intensity. If the pixel is "off" for the entire time, it will be dark, or have a minimum brightness or intensity. By using the bit planes, the entire range of color intensity available can be reproduced using the one bit per pixel available in the spatial light modulator.

The bit planes may have non-uniform display times associated with them. In this manner a weighting function is implemented. For example, a first bit plane may be displayed for half the frame time, a second for one quarter, a third for a smaller portion, and a fourth for a still smaller time portion.

To further adapt the display of the bit planes to the human visual system, the bit plane display times can be divided to display the first bit plane twice in a rotation, for two different times, so the displayed visual image is updated more frequently. The HVS will see fewer visible artifacts with additional breaks in the image being projected. Because the time each bit plane is displayed at the DMD is non-uniform, the pulses transmitted to the DMD array are said to be pulse width modulated, with the width of the pulses corresponding to the relative weight given a particular bit plane. Therefore, the pulse width modulation (PWM) sequences control the intensity for the pixels.

In a further aspect of conventional image display projection systems using binary spatial light modulators, these SLMs have only one bit per pixel of image storage. The pixels contain a latch and a reflective device associated with the latch, such as a mirror. Also, in these conventional devices, a one bit storage cell is associated with the pixel. While a particular pixel frame is being displayed by the pixel, a single bit memory cell located adjacent to the pixel is loaded with the next pixel value for display. When the line or the array of pixel data is loaded, a "reset" will cause all of the pixel elements to update (latch) the next value for display, and the one bit storage loading process can begin again. The time required to reset and load the pixel array with the next bit frame affects how fast the data can be displayed.

Figure 3:
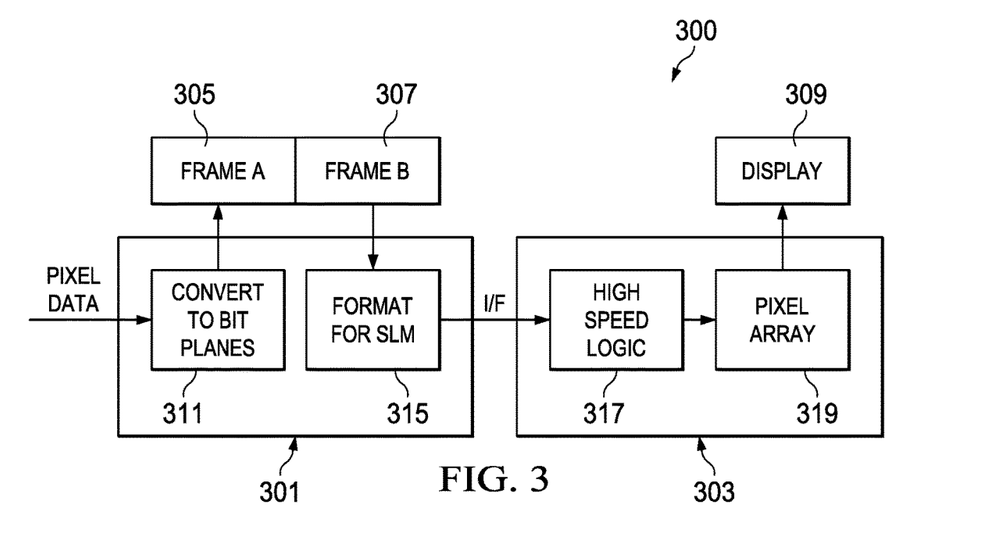
FIG. 3 depicts a simplified block diagram of a datapath portion of a conventional optical projection system.

FIG. 3 shows a system 300 and portions of the data path for a conventional digital imaging system using a DMD controller ASIC 301 and a SLM device 303.

In FIG. 3, the DMD controller 301 receives pixel data. A block 311 converts the incoming pixel data, which has multiple bits for each color for each pixel, these are mapped into bit planes. In an example, a frame for display can include colors red, green and blue and can include, in one example, 8 bits per pixel for each color or 24 bits for each pixel. The conversion block 311 converts the image frame data received by the ASIC into bit planes and stores the bit planes in a frame buffer 305. The data can be formatted before writing the data to the frame buffer 305. In a second frame buffer 307, the data is read from the frame buffer 305. By switching between the two frame buffers, the frame being read for transmission to the SLM is separated from the frame being written with bit planes corresponding to the incoming frame image data. Employing two frame buffers enables the system to operate continuously, receiving data, converting and writing bit planes to a first frame buffer while simultaneously reading bit plane data from a previously loaded frame buffer. After the data is read from the frame buffer 307 in FIG. 3, additional data formatting can be performed to ready the data for transmission on the high speed interface I/F. For example, in a packet data interface, the data packets can be formed.

Multiple bit planes are displayed during each frame display time period. The bit planes are arranged so as to create the desired pixel intensity. To divide the changes in the image for better displayed image quality with few or no visible artifacts, the number of bit planes transmitted to the SLM can be increased from 24 (8 bits per pixel for 3 colors) to 60 or more, with some repeating. In a conventional application, some of the bit planes are repeated, and because conventional solutions do not make any correlation between the data transmitted for the various ones of the bit planes, all of the pixel data for each bit plane is transmitted over the data interface I/F in FIG. 3 to the SLM device 303. Blocks 311 and 315 in the controller circuit 301 provide formatting that creates the bit planes from the read frame buffer and then transmits these bit planes to the SLM 303 on the data interface labeled I/F.

In FIG. 3 SLM 303 includes high speed logic 317 and a data receiver 319. The data transmitted from the DMD controller 301 is received by the high speed logic 317 which writes the storage cells for the mirror array 319, and when the entire array, a line, or another portion is ready, a "reset" to the DMD pixels causes them to update with the data from the storage cells and display the new image corresponding to the bit plane. The load and reset process is repeated for all of the bit planes for a particular image display time to provide the color and intensity information for viewing by the HVS. For example, the image is displayed by illuminating the DMD mirrors and the reflected images are projected for viewing at screen 309. The display is reset each time a bit plane is loaded so that all of the bit planes for a given frame are displayed in a sequence during the frame display time.

In an example with an image display having four bit planes, referred to as bit planes 0-3 for a given color that are to be displayed during a predetermined color display time, each bit plane has an associated time weighting. For a four bit plane example, the weights might be 1, 2, 4, and 8. Based on the total sum of the time weights, in this example the sum is 15, the associated time proportion for bit planes 0, 1, 2, 3 might be 1/15, 2/15, 4/15, 8/15. When a particular bit plane is displayed with multiple instances, its total display time will still match the corresponding display proportion. When a bit plane is displayed with more than one instance in a display time, the bit plane is referred to as being "split". For example, in a bit plane sequence of '30213', bit plane 3 is a split bit plane.

Display devices with a pixel pitch of less than about 7.5 microns can create diffraction based gray shade non-linearities. These non-linearities result in visible artifacts. The artifacts are particularly visible across shallow gradients. The high frequency dither patterns used for making smooth gray scale rendition can operate as interference patterns for the wavelengths of illumination light. In an example where a desired gray scale is half-way between two producible gray scale shades, dithering would be expected to create the desired gray shade between the two producible gray scale shades using a 50% dithering pattern. However, the interference that occurs changes the gray shade that actually results. Depending on the wavelength of the illumination light, the resulting gray shade is either brighter than desired (due to constructive interference), or is darker than expected (due to destructive interference).

The amount of non-linearity observed is dependent upon the local high-frequency characteristics. Because the non-linearity is dependent on multiple factors, a simple global correction factor is insufficient to correct the non-linearities.

Figure 4:
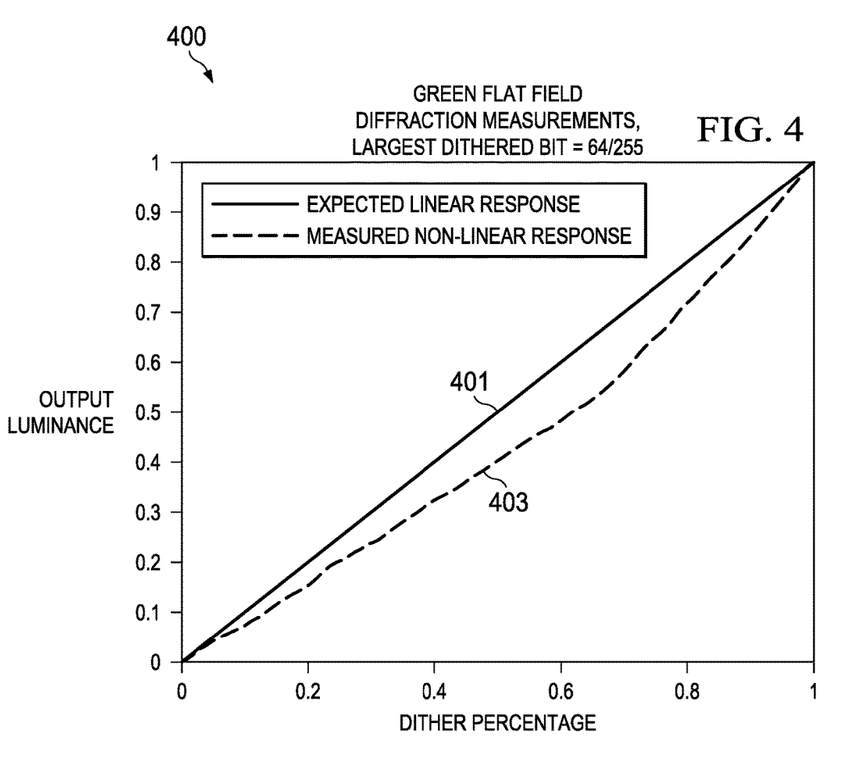
FIG. 4 depicts a graph of the non-linear response of an image projection system when dithering is used to produce gray scale intensities from a spatial light modulator.

FIG. 4 illustrates a graph 400 of the response for the output luminance, shown increasing on the vertical or Y axis, and the dither percentage, shown increasing from left to right on the horizontal or X axis. Line 401 illustrates the expected response, which is linear. In line 401, as luminance increases, the dither percentage increases at the same or a similar rate. Line 403 illustrates the observed real response of an example system. Line 403 illustrates a non-linearity, which is: as the dither percentage increases, it does not linearly track the output luminance, and (as shown in line 403) the variance is not uniform, but instead varies in a complex manner.

Dithering techniques are used to create the range of gray shades desired from a reduced number of producible gray shades in visual display systems. U.S. Pat. No. 7,075,506, entitled "Spatial Temporal Multiplexing", which is hereby incorporated herein in its entirety, discloses masks operated to produce contours with reduced visible artifacts.

In example embodiments, the non-linear response of the dithering used to produce the range of gray shade intensities needed is addressed by restricting the dithering used to only low intensity bit planes. As shown in FIG. 4, the non-linearity that occurs in the dithering response increases with increasing luminance. By restricting high frequency dithering to these low intensity bit planes, the dithering is restricted to a small portion of the illuminated light. In this manner the non-linearity can be reduced below perceivable levels, that is, visible artifacts that would otherwise appear to a viewer when using conventional approaches are greatly reduced or eliminated. Accordingly, diffraction artifacts are surprisingly eliminated or reduced from the displayed or projected image from the system by application of example embodiments.

Figure 5:
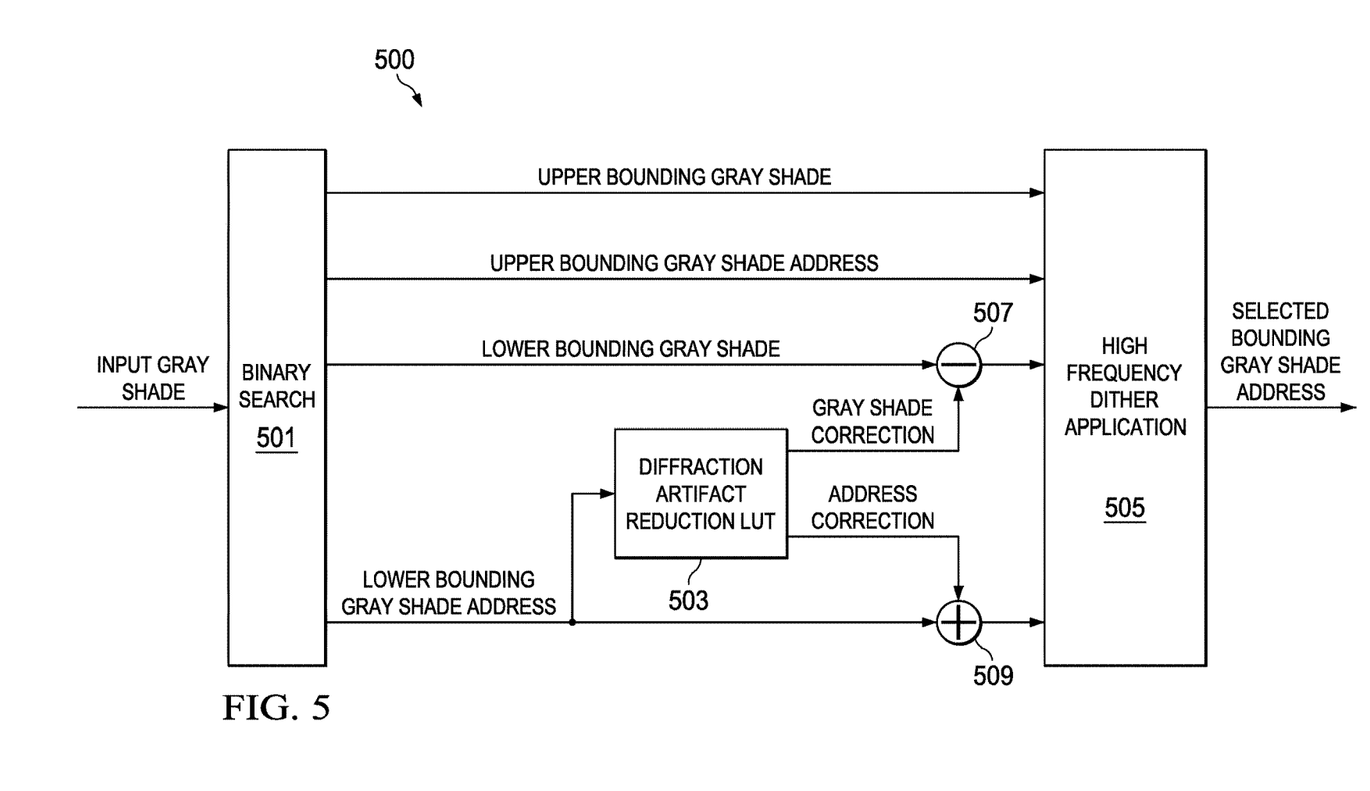
FIG. 5 depicts a block diagram of an example embodiment with diffraction artifact reduction.

FIG. 5 illustrates a high level block diagram of an example system 500 for performing the diffraction artifact reduction. The input grade shade, which can come from a digital video input following a de-gamma correction, is input to a binary search block 501. The binary search 501 compares the input gray shade to a set of achievable gray shades that the system can reproduce. For a given system, a small set of gray shades can be accurately produced, while shades that fall between the producible gray shades can be displayed using dithering and pulse width modulation techniques. The binary search block 501 compares the input gray shade to the achievable gray shades, and outputs four quantities. The outputs include the upper bounding gray shade, that is the achievable gray shade that is above the input gray shade, the upper bounding gray shade address, that is, an index associated with the upper bounding gray shade in a look up table or other similar list or storage mechanism; the lower bounding gray shade, that is, the achievable gray shade that is just below the input gray shade value, and the lower bounding gray shade address.

In an example arrangement, block 503 performs a diffraction artifact reduction using a look up table. Block 503 uses the position, index, or address of the lower bounding gray shade to produce a gray shade correction amount, and an address correction offset. The gray shade correction amount is subtracted from the lower bounding gray shade, and the address correction offset is added to the lower bounding gray shade address. The diffraction artifact reduction look up table allows achievable gray shades to be created using more than one pulse width modulation (PWM) pattern. The PWM pattern selected depends on whether the input gray shade is above, or below, an achievable gray shade. Bit planes may then simply be turned on, instead of dithered on, after a gray shade threshold has been reached. As a result, dither can be restricted to certain bit planes, using clever PWM sequence design and corresponding LUT configurations. For reducing visible diffraction artifacts, example embodiments limit dithering to low intensity bit planes, putting any non-linearity that results from diffraction below the HVS perceivable levels for visible artifacts.

A dither percentage can be determined for the input gray shade with the modifications done to the lower bounding gray shade as described above. Equation 1 provides the dither percentage:

$$DitherPercentage = \frac{(InputGrayShade - LowerBoundingGrayShade)}{(UpperBoundingGrayShade - LowerBoundingGrayShade)} \quad \text{Equation 1}$$

In block 505, high frequency dithering is performed using the corrected values for the lower bounding gray shade address, and the lower bounding gray shade. Depending on the high frequency dithering algorithm used, either the upper or lower bounding gray shade is routed for a given pixel, and the corresponding position in the sorted list of achievable gray shades, with the modification of done to the lower bounding gray shade's position, is used to determine which PWM pattern to employ for that given achievable gray shade. Because more than one PWM pattern can be used to produce a desired gray shade, the diffraction artifacts are reduced by using example embodiments to modify the PWM sequences for certain gray shades to reduce perceivable artifacts in the displayed image.

Consider an example with an input or desired gray scale of 5. In the examples discussed here, the notation used is that the higher the gray shade intensity, the brighter the pattern will appear, so that a 0 will be darkest or black. If an example system has achievable gray shades of 4 and 10, then a calculation can be made as to how to display the desired gray scale of 5 using bit plane sequences. The difference between the lower bounding gray shade, 4, and the desired gray shade, 5, is 1. The difference between the upper bounding gray shade, 10, and the lower bounding gray shade, 4, is 6, so the ratio from Equation 1 is 1/6. Taking the dithered combination PWM 10*1/6+PWM 4*5/6 will result in the desired gray shade intensity, 5, appearing to a viewer at the display.

For ease of explanation: (a) a first example of diffraction artifact reduction omits the DAR of example embodiments; and (b) a second example of diffraction artifact reduction includes and uses the DAR of example embodiments to further demonstrate the operations, and to illustrate the results achieved.

Consider a system with pulse width modulation sequence bit weights for 16 bit planes provided as: (1, 2, 4, 8, 12, 20, 32, 48, 72, 104, 120, 120, 120, 120, 120, 120)/1023. If all 16 bit planes are turned on, the gray shade achieved is 1023. That gray shade code would be represented as a binary number b1111111111111111. By adding all of the bit plane weights that are turned on in the code, the gray shade can be computed.

Table 1 illustrates the directly achievable gray shades for the example system. In this example, only 127 achievable gray shades (out of a possible 1023) are populated in a look up table that is used as a binary search list. Table 1 illustrates the particular achievable gray shades that are used. Table 1 is taken from a real example, so some of its achievable gray shades are not directly equal to the sum of the bit planes. This is because in a system using a DMD as a spatial light modulator, the time required to reset the mirrors, and the time needed or switching the mirrors on, introduces some non-linearity.

TABLE 1

Binary Search LUT, No DAR

| Achievable Gray Shade (0 to 1023) | Position | Bit Plane Code Word |
|---|---|---|
| 0 | 0 | 0 |
| 1 | 1 | 1 |
| 2 | 2 | 3 |
| 3 | 3 | 4 |
| 4 | 4 | 5 |
| 7 | 5 | 7 |
| 8 | 6 | 8 |
| 9 | 7 | 9 |
| 11 | 8 | 11 |
| 12 | 9 | 12 |
| 13 | 10 | 13 |
| 15 | 11 | 15 |
| 16 | 12 | 20 |
| 17 | 13 | 21 |
| 19 | 14 | 23 |
| 20 | 15 | 24 |
| 21 | 16 | 25 |
| 23 | 17 | 27 |
| 24 | 18 | 28 |
| 26 | 19 | 30 |
| 27 | 20 | 39 |
| 28 | 21 | 40 |
| 29 | 22 | 41 |
| 31 | 23 | 43 |
| 32 | 24 | 44 |
| 33 | 25 | 45 |
| 35 | 26 | 47 |
| 36 | 27 | 52 |
| 37 | 28 | 53 |
| 39 | 29 | 55 |
| 40 | 30 | 56 |
| 41 | 31 | 57 |

TABLE 1-continued

Binary Search LUT, No DAR

| Achievable Gray Shade (0 to 1023) | Position | Bit Plane Code Word |
|---|---|---|
| 43 | 32 | 59 |
| 44 | 33 | 60 |
| 45 | 34 | 61 |
| 47 | 35 | 63 |
| 48 | 36 | 84 |
| 51 | 37 | 87 |
| 52 | 38 | 88 |
| 55 | 39 | 91 |
| 58 | 40 | 94 |
| 59 | 41 | 103 |
| 61 | 42 | 105 |
| 63 | 43 | 107 |
| 66 | 44 | 110 |
| 67 | 45 | 115 |
| 71 | 46 | 119 |
| 75 | 47 | 123 |
| 79 | 48 | 127 |
| 81 | 49 | 177 |
| 83 | 50 | 179 |
| 87 | 51 | 183 |
| 91 | 52 | 187 |
| 95 | 53 | 191 |
| 99 | 54 | 224 |
| 103 | 55 | 227 |
| 107 | 56 | 231 |
| 111 | 57 | 235 |
| 115 | 58 | 239 |
| 119 | 59 | 247 |
| 123 | 60 | 251 |
| 127 | 61 | 255 |
| 143 | 62 | 376 |
| 151 | 63 | 383 |
| 153 | 64 | 434 |
| 159 | 65 | 439 |
| 167 | 66 | 447 |
| 171 | 67 | 480 |
| 179 | 68 | 487 |
| 187 | 69 | 495 |
| 195 | 70 | 507 |
| 198 | 71 | 719 |
| 211 | 72 | 735 |
| 218 | 73 | 751 |
| 231 | 74 | 767 |
| 247 | 75 | 888 |
| 254 | 76 | 895 |
| 259 | 77 | 948 |
| 270 | 78 | 959 |
| 276 | 79 | 993 |
| 287 | 80 | 1004 |
| 302 | 81 | 1023 |
| 310 | 82 | 1528 |
| 318 | 83 | 1743 |
| 330 | 84 | 1759 |
| 350 | 85 | 1791 |
| 366 | 86 | 1912 |
| 374 | 87 | 1919 |
| 382 | 88 | 1976 |
| 397 | 89 | 2019 |
| 414 | 90 | 2040 |
| 422 | 91 | 3071 |
| 430 | 92 | 3576 |
| 438 | 93 | 3791 |
| 456 | 94 | 3822 |
| 470 | 95 | 3839 |
| 486 | 96 | 3960 |
| 493 | 97 | 3967 |
| 513 | 98 | 4064 |
| 520 | 99 | 6122 |
| 533 | 100 | 7159 |
| 545 | 101 | 7667 |
| 557 | 102 | 7887 |
| 589 | 103 | 7935 |
| 606 | 104 | 8056 |
| 625 | 105 | 8144 |
| 637 | 106 | 12260 |

TABLE 1-continued

Binary Search LUT, No DAR

| Achievable Gray Shade (0 to 1023) | Position | Bit Plane Code Word |
|---|---|---|
| 649 | 107 | 14324 |
| 661 | 108 | 15359 |
| 675 | 109 | 15869 |
| 689 | 110 | 16095 |
| 709 | 111 | 16127 |
| 725 | 112 | 16248 |
| 744 | 113 | 24528 |
| 756 | 114 | 28644 |
| 775 | 115 | 31738 |
| 790 | 116 | 32250 |
| 808 | 117 | 32479 |
| 824 | 118 | 32600 |
| 840 | 119 | 49007 |
| 856 | 120 | 57268 |
| 876 | 121 | 63459 |
| 892 | 122 | 64503 |
| 910 | 123 | 65017 |
| 928 | 124 | 65247 |
| 968 | 125 | 65404 |
| 1023 | 126 | 65535 |

In Table 1, the percentage of total light being dithered for a given gray shade transition can be calculated by summing the bit weights of the unique bit planes between two bit plane code words. As an example, the percentage of light being spatially dithered if the input gray shade is between 302 and 310, which in Table 1 corresponds to gray shade positions 81 and 82, is given by the expression in Equation 2:

$$\text{xor}(1023,1528) \cdot [120\ 120\ 120\ 120\ 120\ 120\ 104\ 72\ 48\ 32\ 20\ 12\ 8\ 4\ 2\ 1] = \text{xor}(b01111111111, b10111111000) \cdot [120\ 120\ 120\ 120\ 120\ 120\ 104\ 72\ 48\ 32\ 20\ 12\ 8\ 4\ 2\ 1] = [1\ 1\ 0\ 0\ 0\ 0\ 0\ 1\ 1\ 1] \cdot [120\ 120\ 120\ 120\ 120\ 120\ 104\ 72\ 48\ 32\ 20\ 12\ 8\ 4\ 2\ 1] = 120+104+0+0+0+0+0+4+2+1 = 231/1023 = 22.58\%$$

Equation 2

In this example where the conventional approaches are used, the high frequency dither pattern is being applied to about 23% of the illuminated light. This relatively large amount of spatially dithered light will produce an objectionable (visible) diffraction related non-linearity in a displayed image.

Figure 6:
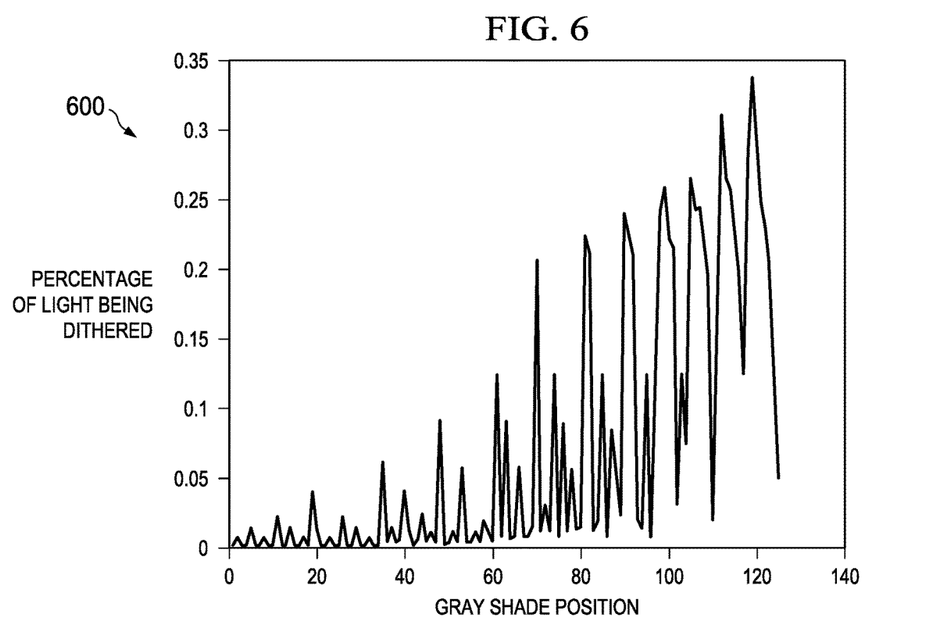
FIG. 6 depicts a graph of dithering percentage values plotted against gray shade intensities for an example system.

FIG. 6 is a data graph that illustrates the percentage of light being dithered (plotted on the vertical or Y axis) against the gray shade position (plotted on the horizontal, or X axis). For the positions 81-82, the percentage computed in Equation 2 is shown as approximately 23%.

To further explain the operation and benefits of example embodiments, the example described above will be performed using diffraction artifact reduction (DAR). Using DAR in the system, objectionable levels of dithered light are identified for the input gray shades, and corresponding achievable gray shades are then created using different PWM patterns. Dithering is avoided for the higher luminosity bit planes, so that diffraction artifacts are constrained to low intensity levels that are not perceivable to a human viewer.

In the example given above, where the gray shade positions are 81 and 82 in Table 1, the objectionable transition is due to the bit planes 9 and 10 (for the 16 bit plane weights shown above, these correspond to bit weights 120 and 104) dithering on. This is observable by forming the bit plane code word from the PWM sequences using the bit plane weights described above. Using an example embodiment, DAR is applied and instead of dithering these bit planes, the bit planes are simply turned on at a gray shade threshold. Achievable gray shade 302 is created by turning on bit plane code word 1023. A similar gray shade may also be created, as shown in Table 2, gray shade 295, by turning on bit plane code word 1799. The bit plane code word 1799 corresponds to summing the bits that are "on" and multiplying each by the bit plane weight, in this example the gray shade value 295 is obtained for the bit plane code word sum 1799. To avoid dithering in this example, the DAR LUT is programmed to employ the gray shade 302 (and bit plane code word 1023) when the input gray shade is less than 302, and gray shade 295, when the gray shade is greater than or equal to 302. For that position in the binary search list, the DAR LUT would select the value 7 (302−295) for the gray shade correction amount, and would select an address correction amount that would append a new bit plane code word to the list of achievable gray shades. By adjusting the lower bounding gray shade, the percentage of dithered light can be reduced to a level where diffraction artifacts are not visible to a human observer.

The approach of example embodiments can be applied to create a binary search and DAR LUT that will limit the dithering percentage to be below a predetermined percentage. Table 2 illustrates an example look up table for the above system that was created using DAR to restrict the dithering percentage to less than or about 10%. This look up table can be developed after the image projection system is characterized, and the look up table can then be stored for operating in real time processing of incoming desired gray shade pixel values as input data. In one arrangement, the rows of Table 2 are created in a fixed size look up table by substituting rows that are not needed or are less desirable with a set of new achievable gray shade PWM sequences. In an alternative arrangement, where memory for the look up table is not size limited, the new entries to the table with the reduced diffraction artifacts can be added to the existing table, instead of replacing existing rows.

TABLE 2

Binary Search LUT, DAR Included

| Achievable Gray Shade (0 to 1023) | Position | DAR Gray Shade Correction Amount | DAR Address Correction Amount |
|---|---|---|---|
| 0 | 0 | 0 | 0 |
| 1 | 1 | 0 | 0 |
| 2 | 2 | 0 | 0 |
| 3 | 3 | 0 | 0 |
| 4 | 4 | 0 | 0 |
| 7 | 5 | 0 | 0 |
| 8 | 6 | 0 | 0 |
| 9 | 7 | 0 | 0 |
| 11 | 8 | 0 | 0 |
| 12 | 9 | 0 | 0 |
| 13 | 10 | 0 | 0 |
| 15 | 11 | 0 | 0 |
| 16 | 12 | 0 | 0 |
| 17 | 13 | 0 | 0 |
| 19 | 14 | 0 | 0 |
| 20 | 15 | 0 | 0 |
| 21 | 16 | 0 | 0 |
| 23 | 17 | 0 | 0 |
| 24 | 18 | 0 | 0 |
| 26 | 19 | 0 | 0 |
| 27 | 20 | 0 | 0 |
| 28 | 21 | 0 | 0 |
| 29 | 22 | 0 | 0 |
| 31 | 23 | 0 | 0 |
| 32 | 24 | 0 | 0 |
| 33 | 25 | 0 | 0 |

TABLE 2-continued

Binary Search LUT, DAR Included

| Achievable Gray Shade (0 to 1023) | Position | DAR Gray Shade Correction Amount | DAR Address Correction Amount |
|---|---|---|---|
| 35 | 26 | 0 | 0 |
| 36 | 27 | 0 | 0 |
| 37 | 28 | 0 | 0 |
| 39 | 29 | 0 | 0 |
| 41 | 30 | 0 | 0 |
| 43 | 31 | 0 | 0 |
| 44 | 32 | 0 | 0 |
| 45 | 33 | 0 | 0 |
| 47 | 34 | 0 | 0 |
| 48 | 35 | 0 | 0 |
| 49 | 36 | 0 | 0 |
| 51 | 37 | 0 | 0 |
| 52 | 38 | 0 | 0 |
| 55 | 39 | 0 | 0 |
| 58 | 40 | 0 | 0 |
| 59 | 41 | 0 | 0 |
| 61 | 42 | 0 | 0 |
| 63 | 43 | 0 | 0 |
| 66 | 44 | 0 | 0 |
| 67 | 45 | 0 | 0 |
| 71 | 46 | 0 | 0 |
| 75 | 47 | 0 | 0 |
| 79 | 48 | 0 | 0 |
| 83 | 49 | 0 | 0 |
| 87 | 50 | 0 | 0 |
| 91 | 51 | 0 | 0 |
| 95 | 52 | 0 | 0 |
| 99 | 53 | 0 | 0 |
| 103 | 54 | 0 | 0 |
| 107 | 55 | 0 | 0 |
| 111 | 56 | 0 | 0 |
| 115 | 57 | 0 | 0 |
| 119 | 58 | 0 | 0 |
| 123 | 59 | 0 | 0 |
| 127 | 60 | 16 | 120 |
| 131 | 61 | 0 | 0 |
| 135 | 62 | 0 | 0 |
| 139 | 63 | 0 | 0 |
| 145 | 64 | 0 | 0 |
| 151 | 65 | 0 | 0 |
| 155 | 66 | 0 | 0 |
| 163 | 67 | 0 | 0 |
| 167 | 68 | 0 | 0 |
| 175 | 69 | 0 | 0 |
| 179 | 70 | 0 | 0 |
| 185 | 71 | 0 | 0 |
| 191 | 72 | 0 | 0 |
| 198 | 73 | 0 | 121 |
| 206 | 74 | 0 | 0 |
| 215 | 75 | 0 | 0 |
| 222 | 76 | 0 | 0 |
| 231 | 77 | 0 | 0 |
| 239 | 78 | 0 | 0 |
| 251 | 79 | 0 | 0 |
| 263 | 80 | 0 | 0 |
| 275 | 81 | 0 | 0 |
| 282 | 82 | 0 | 0 |
| 295 | 83 | 0 | 0 |
| 302 | 84 | 7 | 122 |
| 310 | 85 | 0 | 0 |
| 322 | 86 | 0 | 0 |
| 338 | 87 | 0 | 0 |
| 350 | 88 | 0 | 0 |
| 366 | 89 | 0 | 0 |
| 374 | 90 | 0 | 0 |
| 389 | 91 | 0 | 0 |
| 406 | 92 | 0 | 0 |
| 420 | 93 | 69 | 123 |
| 432 | 94 | 0 | 0 |
| 452 | 95 | 0 | 0 |
| 461 | 96 | 0 | 0 |
| 481 | 97 | 0 | 0 |
| 493 | 98 | 0 | 0 |
| 514 | 99 | 0 | 0 |
| 540 | 100 | 54 | 124 |
| 552 | 101 | 0 | 0 |
| 572 | 102 | 0 | 0 |
| 594 | 103 | 0 | 0 |
| 609 | 104 | 0 | 0 |
| 630 | 105 | 0 | 0 |
| 657 | 106 | 8 | 125 |
| 677 | 107 | 0 | 0 |
| 697 | 108 | 0 | 0 |
| 721 | 109 | 0 | 0 |
| 749 | 110 | 0 | 0 |
| 776 | 111 | 31 | 126 |
| 796 | 112 | 0 | 0 |
| 817 | 113 | 0 | 0 |
| 844 | 114 | 0 | 0 |
| 871 | 115 | 0 | 0 |
| 897 | 116 | 79 | 127 |
| 937 | 117 | 0 | 0 |
| 974 | 118 | 0 | 0 |
| 1024 | 119 | 0 | 0 |

In Table 2, rows 127, 198, 302, 420, 540, 657, 776, and 897 shown with a positive DAR Address Correction Amount show where a pulse width modulation (PWM) combination is simply turned on (instead of a conventional approach of being dithered on) to avoid creating an objectionable diffraction induced non-linearity. After an appropriate high frequency dither pattern is applied and a single, achievable gray shade has been routed, a LUT is used to map that gray shade's position to a bit plane code word. Table 3 shows the bit plane translation LUT that is used in conjunction with the binary search and the DAR LUT shown above.

TABLE 3

Bit Plane Translation LUT for DAR

| Gray Shade Position | Bit Plane Code Word |
|---|---|
| 0 | 0 |
| 1 | 1 |
| 2 | 3 |
| 3 | 4 |
| 4 | 5 |
| 5 | 7 |
| 6 | 8 |
| 7 | 9 |
| 8 | 11 |
| 9 | 12 |
| 10 | 13 |
| 11 | 15 |
| 12 | 20 |
| 13 | 21 |
| 14 | 23 |
| 15 | 24 |
| 16 | 25 |
| 17 | 27 |
| 18 | 28 |
| 19 | 30 |
| 20 | 39 |
| 21 | 40 |
| 22 | 41 |
| 23 | 43 |
| 24 | 44 |
| 25 | 45 |
| 26 | 47 |
| 27 | 52 |
| 28 | 53 |
| 29 | 55 |
| 30 | 57 |

TABLE 3-continued

Bit Plane Translation LUT for DAR

| Gray Shade Position | Bit Plane Code Word |
|---|---|
| 31 | 59 |
| 32 | 60 |
| 33 | 61 |
| 34 | 63 |
| 35 | 84 |
| 36 | 85 |
| 37 | 87 |
| 38 | 88 |
| 39 | 90 |
| 40 | 94 |
| 41 | 103 |
| 42 | 105 |
| 43 | 107 |
| 44 | 110 |
| 45 | 115 |
| 46 | 119 |
| 47 | 123 |
| 48 | 127 |
| 49 | 179 |
| 50 | 183 |
| 51 | 187 |
| 52 | 191 |
| 53 | 224 |
| 54 | 227 |
| 55 | 231 |
| 56 | 235 |
| 57 | 239 |
| 58 | 247 |
| 59 | 251 |
| 60 | 255 |
| 61 | 396 |
| 62 | 404 |
| 63 | 407 |
| 64 | 413 |
| 65 | 428 |
| 66 | 436 |
| 67 | 444 |
| 68 | 447 |
| 69 | 484 |
| 70 | 487 |
| 71 | 494 |
| 72 | 504 |
| 73 | 511 |
| 74 | 811 |
| 75 | 824 |
| 76 | 831 |
| 77 | 860 |
| 78 | 876 |
| 79 | 892 |
| 80 | 968 |
| 81 | 984 |
| 82 | 991 |
| 83 | 1016 |
| 84 | 1023 |
| 85 | 1807 |
| 86 | 1823 |
| 87 | 1851 |
| 88 | 1883 |
| 89 | 1912 |
| 90 | 1919 |
| 91 | 1983 |
| 92 | 2032 |
| 93 | 2047 |
| 94 | 3862 |
| 95 | 3894 |
| 96 | 3903 |
| 97 | 3955 |
| 98 | 3967 |
| 99 | 4064 |
| 100 | 4095 |
| 101 | 7962 |
| 102 | 7994 |
| 103 | 8048 |
| 104 | 8063 |
| 105 | 8160 |
| 106 | 8191 |
| 107 | 16167 |
| 108 | 16191 |
| 109 | 16248 |
| 110 | 16344 |
| 111 | 16383 |
| 112 | 32549 |
| 113 | 32573 |
| 114 | 32632 |
| 115 | 32736 |
| 116 | 32767 |
| 117 | 65338 |
| 118 | 65407 |
| 119 | 65535 |
| 120 | 391 |
| 121 | 803 |
| 122 | 1799 |
| 123 | 3846 |
| 124 | 7946 |
| 125 | 16135 |
| 126 | 32516 |
| 127 | 65282 |

In Table 3, rows at gray shade positions 60, 73, 84, 93, 100, 106, 111, and 116 correspond to the rows 127, 198, 302, 420, 540, 657, 776, and 897 in Table 2. The rows 121-127 in Table 3 are appended at the end, such as the code word 1799 described in the example above being placed at row 122. This look up table shown in Table 3 can be determined for a system during system characterization and stored. The look up table is then available for processing high precision gray scale input data to achievable gray shades, using pulse width modulation sequences the system can realize.

Figure 7:
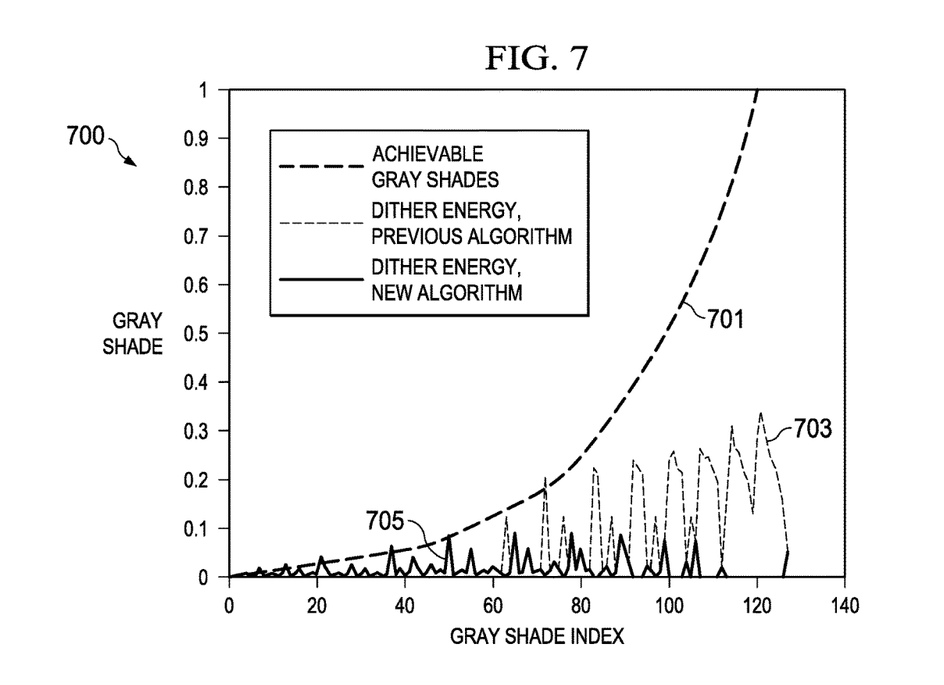
FIG. 7 illustrates a graph of the performance results of a conventional image projection system in comparison to the performance results of an image projection system incorporating example embodiments.

The graph in FIG. 7 illustrates a graph 700 comparing: (a) the system performance obtained using the conventional approach, without the DAR reduction algorithm of example embodiments; and (b) the performance obtained using example embodiments. The comparison is shown in terms of the dither energies for gray shades displayed. The vertical axis in FIG. 7 depicts the resulting gray shade intensities normalized between 0 and 1. The horizontal axis in FIG. 7 depicts the gray shade index. The solid curve numbered 701 indicates the achievable gray shades for the system. Curve 703 indicates the dither energy used in forming the gray shades using the conventional approach for dithering. Curve 705 indicates the dither energy used in forming these gray shades using an example DAR algorithm with the look up tables described above to reduce diffraction artifacts. The DAR algorithm of example embodiments reduces dither energy by restricting dithering to low intensity bit planes, putting any diffraction artifacts that may result below the perceivable limit of the human visual system.

Figure 8:
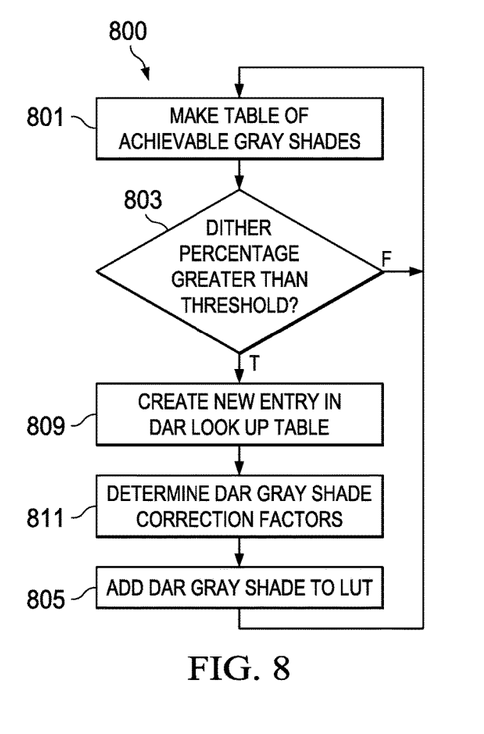
FIG. 8 illustrates a flow diagram of a first example method.

FIG. 8 illustrates a flow diagram 800 of a method for the DAR algorithm. In block 801, the table of achievable gray shades, such as Table 1 shown above, is formed for a digital image projection system. These are the gray shade levels that can be formed using bit planes but without dithering. To form additional gray shade levels, dithering will be required.

At step 803, the look up table from step 801 is analyzed and for those rows where the dithering percentage needed between the achievable gray scales would be greater than a threshold, a decision is made to transition to step 809. If the dither percentage between the achievable gray scales would not be too great, the method transitions to step 801 and continues. At step 809, the lower bounding gray scale for the pair of achievable gray shades is modified by creating a new entry in the look up table. At step 811, the gray scale correction and gray scale address correction factors are determined and stored. At step 805 the new entry is added to the look up table. Each of these steps corresponds to the steps described in the example given above with DAR in forming Table 2, and Table 3. The method of FIG. 8 continues until the table of achievable gray shades (such as Table 1, in the example given above) is completely analyzed. In one example, the method of FIG. 8 is performed off-line or before processing of pixel data and the entries in the look-up tables are system specific, but can be determined during design and manufacture of the system or during post-manufacture testing, and stored in look-up tables before using the system for displaying images. In an alternative example method, the look up table can be populated during system operation in real time.

Figure 9:
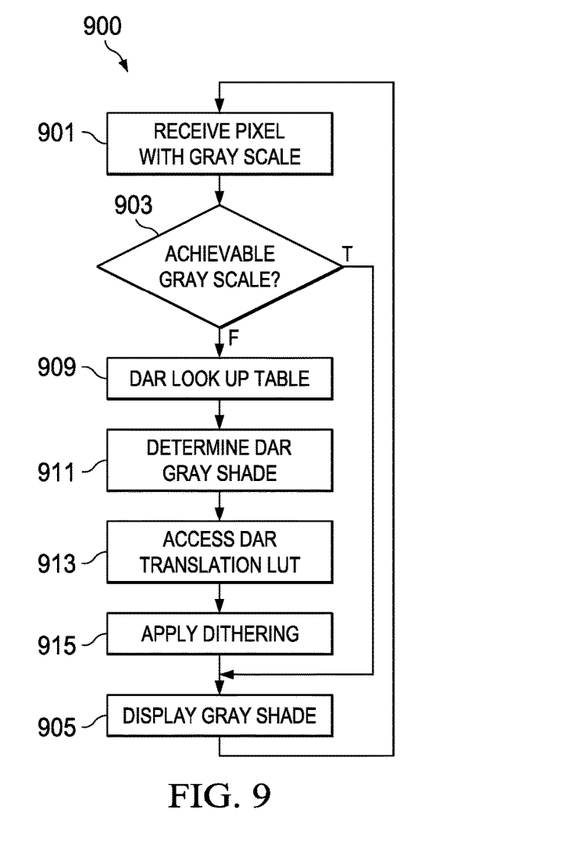
FIG. 9 illustrates a flow diagram of a second example method.

FIG. 9 illustrates another flow diagram 900 of a method showing the operation of the DAR algorithm of example arrangements in processing video data. In FIG. 9, the system receives data corresponding to a pixel to be displayed with a desired gray shade at step 901. At step 903, a decision is made based on whether the pixel gray shade is one that is an achievable gray shade, where no dithering is needed. If a binary search of the look up table of achievable gray shades indicates this pixel is an achievable gray shade, the gray shade is displayed in step 905. If the decision is false at step 903, then the DAR look up table is used at step 909 to determine the upper bounding gray shade and the lower gray shade, and using the look up table as described above, the DAR gray shade is selected. At step 913, the translation look up table is used to translate to the entry in the DAR look up table. After step 913, the method transitions to step 915, and the necessary dithering is applied to achieve the desired pixel intensity. Finally the method then flows to step 905 and the gray shade is displayed.

Figure 10:
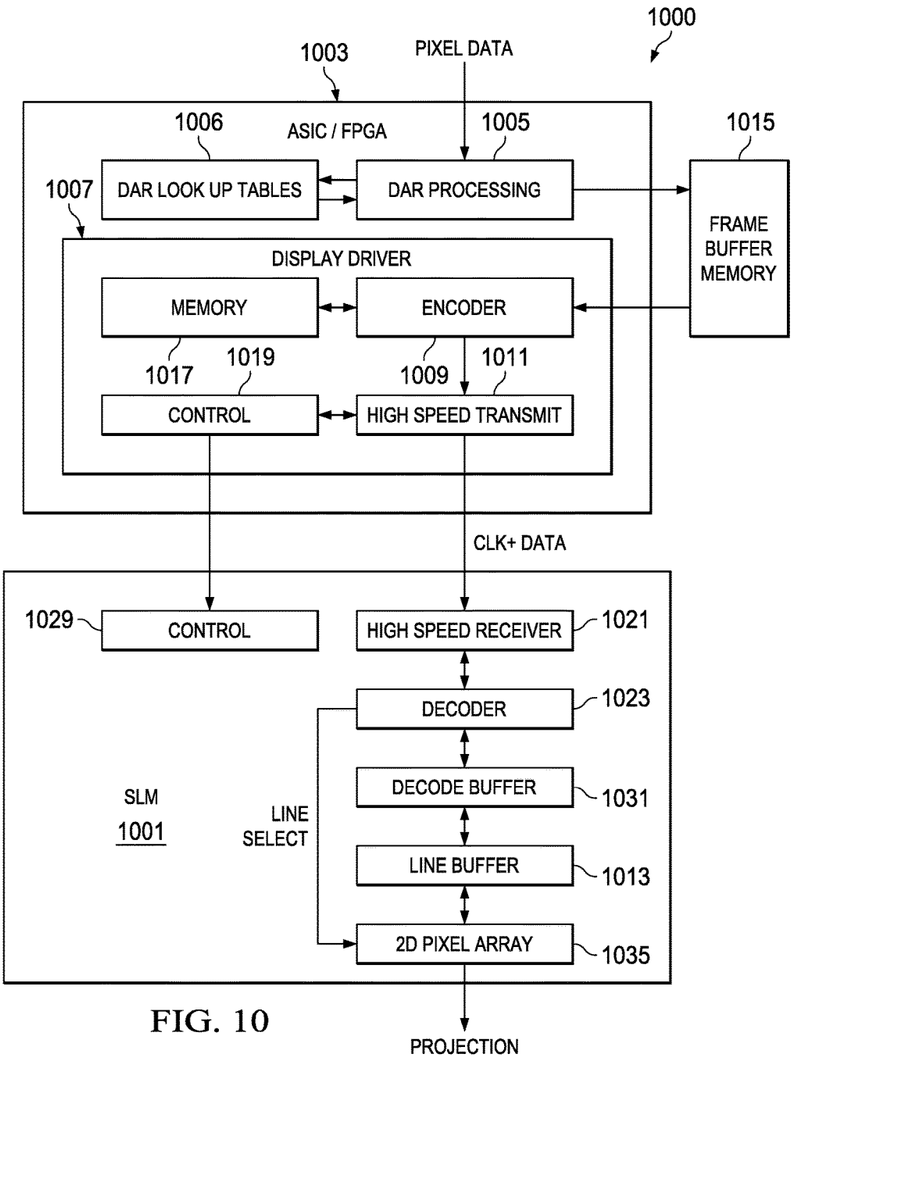
FIG. 10 illustrates a block diagram of a system for diffraction artifact reduction.

FIG. 10 illustrates, in a block diagram 1000, a system for use with example embodiments. The various blocks of FIG. 10 are described by the function performed. For example, these blocks can be implemented using dedicated hardware, such as dedicated logic gates arranged in the digital controller or ASIC. Digital circuitry (such as registers, stacks, multipliers, ALUs and comparators) can be used. In alternative arrangements, the blocks shown in FIG. 10 can be formed using programmable logic including controllers or microprocessors within the digital controller or ASIC. Also, instructions needed to cause the blocks to perform the functions described can be stored within the ASIC. These instructions can be provided as firmware, machine code or software. If the instructions are not stored within the ASIC, an external memory can be provided and coupled to the ASIC, this can be non-volatile memory such as a FLASH, ROM, EEPROM or other memory suitable for storing and retrieving program instructions.

In FIG. 10, pixel data is received into ASIC 1003 for processing. The block 1005 performs bit plane processing including the DAR reduction methods described above. The block 1005 uses memory to store the look up tables in block 1006. Alternatively the look up tables can be stored in external memory devices. The DAR processing block stores bit plane data into the image frame buffer 1015 which contains data corresponding to frames for display. A display driver 1007 fetches data for display from the image frame buffer 1015. This data can be encoded at block 1009 for transmission to the SLM 1001. A local memory 1017 is used with encoder 1009, while the high speed transmission block 1011 and control 1019 are used to place the data on a high speed interface to the SLM 1001.

SLM 1001 includes a high speed receiver 1021 for receiving the image data, a decoder 1023 for decoding the encoded image data, and a set up buffers for collecting lines in line buffer 1013, and loading the pixel memory in the SLM in block 1035. After the bit plane is loaded into the pixel memory, the frame is displayed and reflected light corresponding to the frame is output to the projection optics.

For an example method of reducing diffraction artifacts in a displayed image from a digital image projection system, a digital controller is coupled to a spatial light modulator by a data interface. The spatial light modulator includes a two dimensional array of pixels. Also, the method includes: receiving signals containing pixel image data at the digital controller; processing the image data to determine a desired gray scale for a pixel to be produced by the spatial light modulator; comparing the desired gray scale to achievable gray scales of the digital image projection system; determining an upper bounding achievable gray scale that is greater than the desired gray scale; determining a lower bounding achievable gray scale that is less than the desired gray scale; determining a dithering percentage for the desired gray scale; responsive to the determining, choosing one of the upper bounding achievable gray scale and the lower bounding achievable gray scale; and if the lower bounding achievable gray scale is selected, choosing a modified lower bounding gray scale to reduce the dithering percentage.

In another variation, the method includes comparing the desired gray scale to achievable gray scales of the digital image projection system, which further includes: forming a look up table of gray scale intensities the digital image projection system can physically produce; and searching the look up table using the desired gray scale.

In at least one alternative, the methods include searching the table using the desired gray scale, which further includes using a binary search to search the look up table. In another arrangement, the methods include: outputting an upper bounding gray shade from the look up table and a corresponding upper bounding gray shade address; and outputting a lower bounding gray shade from the look up table and a corresponding lower bounding gray shade address. In yet another alternative, the methods include choosing a modified lower bounding producible gray scale to reduce the dithering percentage, which further includes: using the look up table of achievable gray shades for the digital image projection system; determining the dither percentage for gray shades between entries in the look up table of achievable gray shades; identifying rows in the look up table where the dither percentage is greater than a predetermined desired maximum dither percentage; for the identified rows, creating a modified lower bounding gray shade with a different gray shade that is similar to the lower bounding gray shade, but which will result in a lowered dithering percentage; and appending the modified lower bounding gray shade to a diffraction artifact reduction look up table.

In a further alternative, the methods include forming a translation look up table containing an address correction for the modified lower bounding gray shades to access the diffraction artifact reduction look up table. In another version, the methods further include: receiving a pixel image data having a desired gray shade; performing a search to identify an upper bounding gray shade and a lower bounding gray shade using the diffraction artifact reduction look up table; determining whether to select the upper bounding gray shade or the lower bounding gray shade for display; and if the lower bounding gray shade is selected, determining an address correction using the address correction from the translation look up table.

In yet another alternative, the methods further include storing a gray shade correction factor corresponding to a difference between the lower bounding gray shade and the modified lower bounding gray shade in the diffraction artifact reduction look up table row for the modified lower bounding gray shade. In a further alternative, the methods further include using a selected gray shade to display the pixel.

In another variation, the spatial light modulator is a digital micro-mirror device. In a further alternative, a digital micro-mirror device has a pixel pitch less than or equal to about seven microns. In at least one arrangement, the spatial light modulator includes a liquid crystal on silicon device.

In yet another example, a system for displaying images using diffraction artifact reduction includes a digital controller circuit coupled to a data interface. The digital controller circuit is configured to receive pixel image data for display and further configured to form bit planes including lines of data to transmit to a spatial light modulator over the data interface. The digital controller circuit is further configured to employ achievable gray shades to create bit planes corresponding to the gray shade of the pixel image data. A spatial light modulator circuit is coupled to the data interface and configured to receive data from the digital controller circuit corresponding to pixel data for display on an array of pixel elements in the spatial light modulator. Data transmitted from the digital controller circuit to the spatial light modulator further includes achievable gray shades formed from the bit planes using a diffraction artifact reduction to create the gray shade displayed for the pixels.

In another alternative, the digital controller is configured to: receive a pixel data having a desired gray shade; to compare the desired gray shade to a table of achievable gray shades of the system; to determine an upper bounding gray shade and a lower bounding gray shade from the table of achievable gray shades; to determine a dithering percentage of the upper bounding gray shade and the lower bounding gray shade; to determine whether the dithering percentage exceeds a predetermined threshold; and to select between the upper bounding gray shade and a lower bounding gray shade responsive to the determining; and the digital controller is further configured to replace the lower bounding gray shade with a modified lower bounding gray shade; so that the dithering percentage will be lower than the predetermined threshold.

In a further alternative, the digital controller further includes a memory portion storing a look up table indicating achievable gray shades for the system. In another alternative, the digital controller further includes a memory portion storing a diffraction artifact reduction look up table indicating upper and lower bounding gray shades, including modified lower bounding gray shades.

In another alternative, the digital controller further includes a memory portion storing a translation look up table, indicating an address correction value for the modified lower bounding gray shades.

In yet another alternative, the spatial light modulator includes a digital micro-mirror device. In a further example, the digital micro-mirror device includes an array of pixel elements for displaying data having a pixel pitch of less than or equal to about 7 microns.

In a further example of an integrated circuit for use in a digital image projection system having diffraction artifact reduction, a digital controller circuit is coupled to a data interface. The digital controller circuit is configured to receive pixel image data for display and further configured to form bit planes including lines of data to transmit to a spatial light modulator over the data interface. The digital controller circuit is further configured to employ achievable gray shades to create bit planes corresponding to the gray shade of the pixel image data. A first memory portion stores a look up table indicating achievable gray shades for the digital image projection system. A second memory portion stores a diffraction artifact reduction look up table indicating upper and lower bounding gray shades, including modified lower bounding gray shades. A third memory portion stores a translation look up table indicating an address correction value for the modified lower bounding gray shades. The digital controller circuit is further configured to receive a pixel data having a desired gray shade, to compare the desired gray shade to look up table of achievable gray shades, to determine an upper bounding gray shade and a lower bounding gray shade from the look up table of achievable gray shades, and to select between the upper bounding gray shade and a lower bounding gray shade responsive to the determining. The digital controller is further configured to employ the diffraction artifact reduction look up table and the translation look up table to replace the lower bounding gray shade with a modified lower bounding gray shade.

Modifications are possible in the described embodiments, and other embodiments are possible within the scope of the claims.

What is claimed is:

1. A method of reducing diffraction artifacts in a displayed image from a digital image projection system that includes a digital controller coupled to a spatial light modulator by a data interface, wherein the spatial light modulator includes a two-dimensional array of pixels, the method comprising:
   receiving signals containing pixel image data at the digital controller;
   processing the pixel image data to determine a desired gray shade to be produced for a pixel by the spatial light modulator;
   comparing the desired gray shade to achievable gray shades that the digital image projection system can physically produce, including: using the desired gray shade to search a look up table of the achievable gray shades; outputting an upper bounding gray shade from the look up table and a corresponding upper bounding gray shade address, wherein the upper bounding gray shade is greater than the desired gray shade; and outputting a lower bounding gray shade from the look up table and a corresponding lower bounding gray shade address, wherein the lower bounding gray shade is less than the desired gray shade;
   determining a dither percentage for the desired gray shade;
   responsive to the determining, selecting one of the upper bounding gray shade and the lower bounding gray shade; and
   if the lower bounding gray shade is selected, choosing a modified lower bounding gray shade to reduce the dither percentage.

2. The method of claim 1, wherein using the desired gray shade to search the look up table includes using a binary search to search the look up table.

3. The method of claim 1, wherein choosing the modified lower bounding gray shade to reduce the dither percentage includes:

determining the dither percentage between achievable gray shade entries in the look up table;

identifying rows in the look up table where the dither percentage is greater than a desired maximum dither percentage;

for the identified rows, creating the modified lower bounding gray shade with a different gray shade that is similar to the lower bounding gray shade, but which will result in a lowered dither percentage; and appending the modified lower bounding gray shade to a diffraction artifact reduction look up table.

4. The method of claim 3, further comprising forming a translation look up table containing an address correction for the modified lower bounding gray shade for accessing the diffraction artifact reduction look up table.

5. The method of claim 4, wherein using the desired gray shade to search the look up table includes using the desired gray shade to search the diffraction artifact reduction look up table, and wherein choosing the modified lower bounding gray shade includes determining the address correction from the translation look up table.

6. The method of claim 5, wherein appending the modified lower bounding gray shade to the diffraction artifact reduction look up table includes storing a gray shade correction factor corresponding to a difference between the lower bounding gray shade and the modified lower bounding gray shade, in a row of the diffraction artifact reduction look up table for the modified lower bounding gray shade.

7. The method of claim 1, further comprising using the selected gray shade to display the pixel.

8. The method of claim 1, wherein the spatial light modulator includes a digital micromirror device (DMD).

9. The method of claim 8, wherein the DMD has a pixel pitch less than or equal to about seven microns.

10. The method of claim 1, wherein the spatial light modulator includes a liquid crystal on silicon device.

* * * * *